A. C. SMITH.
Cotton Planter.
No. 108,643.  Patented Oct. 25, 1870.
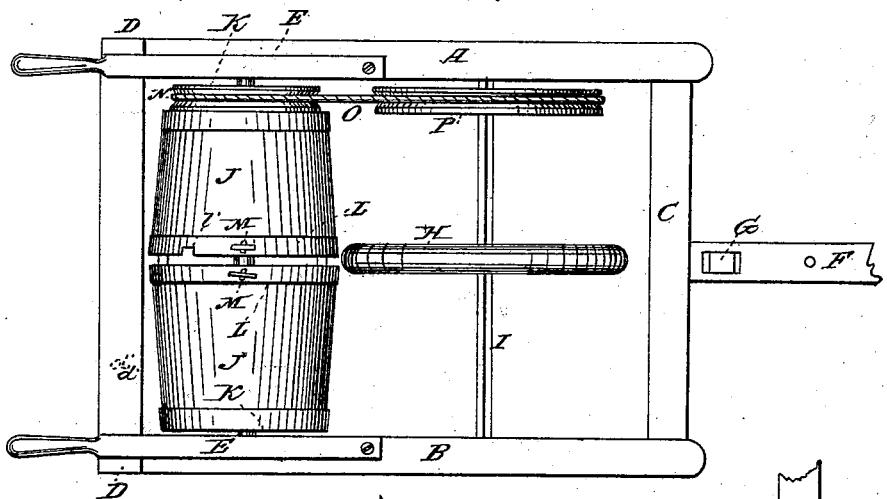
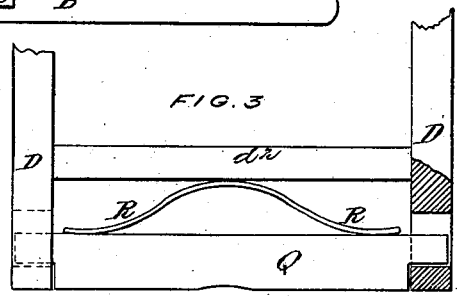
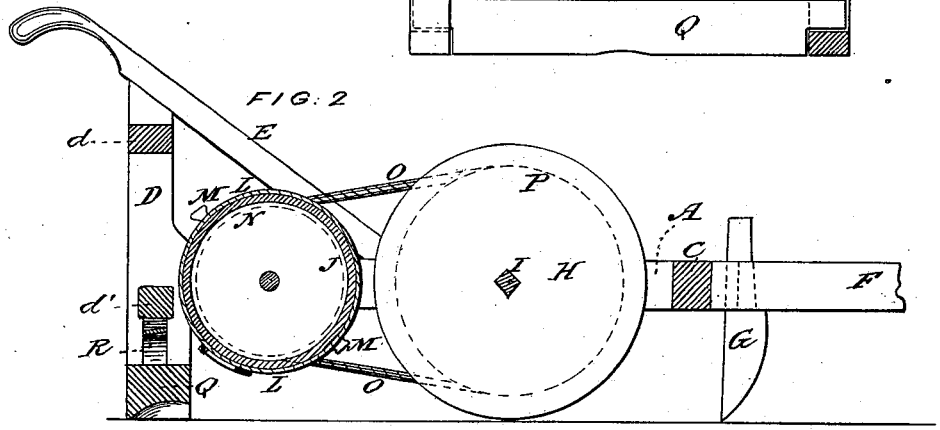

United States Patent Office.

ANDREW C. SMITH, OF ROARING FALLS, TENNESSEE.

Letters Patent No. 108,643, dated October 25, 1870.

IMPROVEMENT IN COTTON-SEED PLANTERS.

The Schedule referred to in these Letters Patent and making part of the same

*To all whom it may concern:*

Be it known that I, ANDREW C. SMITH, of Roaring Falls, in the county of Shelby and State of Tennessee, have invented a new and useful Improvement in Cotton-seed Planter; and I do hereby declare that the following is a full, clear, and exact description thereof, which will enable others skilled in the art to make and use the same, reference being had to the accompanying drawing forming part of this specification, in which—

Figure 1 is a top view of my improved planter.

Figure 2 is a vertical longitudinal section of the same.

Similar letters of reference indicate corresponding parts.

My invention has for its object to furnish an improved machine for planting cotton-seed, corn, peas, and other seeds, conveniently and accurately, and which shall, at the same time, be simple in construction, and easily and conveniently operated; and It consists in the construction and combination of various parts of the machine, as hereinafter more fully described.

A B are the side bars of the frame, which are connected, at their forward ends, by the cross-bar C, and to the rear ends of which are attached two posts or upright bars, D.

The posts D are connected by two cross-bars, $d^1$ $d^2$, as shown in fig. 2.

E are the handles, the lower or forward ends of which are secured to the side bars A B, and their upper ends are attached to the upper ends of the posts D.

To the center or middle part of the front cross-bar C is attached a short tongue-piece, F.

G is the plow or opener to open the furrow to receive the seed, the lower or working part of which is made in about the form shown in fig. 2, so that it will clear itself, and will not catch upon roots and other obstructions, but will slide over them.

Exactly in the rear of the opener G is placed a wheel, H, which presses open the sides of the furrow opened by the tooth G.

The wheel H is attached to a shaft, I, the journals of which revolve in bearings attached to the forward parts of the side bars A B.

J is the seed-dropper, which is made in the shape of a hollow cylinder, with its sides somewhat bulged, as shown in fig. 1, so that the seed may always move down toward the center.

The dropper J is attached to a shaft, K, which passes longitudinally through its center, and the journals of which revolve in bearings attached to the rear parts of the side bars A B.

Around the middle part of the dropper J is formed a slot, strips, four, more or less, being left to connect the parts of the dropper to each other, and keep them in their proper relative positions.

L are bands, fitted upon the middle part of the dropper, so that they may be moved toward or from each other, to make the discharge-opening narrower or wider, according as less or more seed is required to escape.

The bands L are secured in place by hand-screws M, which pass through transverse slots in the said bands, and screw into the body of the dropper.

In the edge of one or both of the bands L are formed notches, $l'$, at suitable distances apart, which, when the bands are adjusted close to each other, form the discharge-openings for planting corn or other smooth seeds.

To one end of the dropper J is attached, or upon it is formed a grooved pulley, N, around which passes the belt O.

The belt O also passes around a pulley, P, attached to the shaft I near one end, so that the dropper may be revolved by the revolution of the wheel H as the machine moves forward.

Q is the covering-block, the lower edge of which is concaved, to give the desired form to the ridge or row.

Upon the ends of the coverer Q are formed tenons, which enter vertical slots in the posts D, as shown in fig. 3.

The coverer Q is allowed to give or rise, to adjust itself to the surface of the ground, and when an obstruction is encountered, and, at the same time, is held down to its work by the spring R, or its equivalent, which is attached to the cross-bar $d^2$, and which rests upon and presses against the top of the said coverer Q.

Having thus described my invention,

I claim as new and desire to secure by Letters Patent—

An improved seed-planter, formed by the combination of the frame-work A B C D $d^1$ $d^2$, handles E, tongue-piece F, opener G, opening-wheel H, shaft I, hollow cylinder J, shaft K, adjustable bands L M, pulleys N P, band O, coverer Q, and spring R, or equivalent, with each other, said parts being constructed and operating substantially as herein shown and described, and for the purposes set forth.

ANDREW C. SMITH.

Witnesses:
ALFRED D. HUNTER,
SILAS P. LIGON.